United States Patent
Engberg (10) Patent No.: US 12,358,202 B2
(45) Date of Patent: Jul. 15, 2025

(54) EXTRUDER HAVING SCREW ELEMENTS WITH A PARTICULARLY LARGE PITCH IN THE REGION OF THE GAS VENTING OPENING, AND USE OF SAID EXTRUDER

(71) Applicant: Covestro Intellectual Property GmbH & Co. KG, Leverkusen (DE)

(72) Inventor: Roland Engberg, Düsseldorf (DE)

(73) Assignee: Covestro Intellectual Property GmbH & Co. KG, Leverkusen (DE)

(*) Notice: Subject to any disclaimer, the term of this patent is extended or adjusted under 35 U.S.C. 154(b) by 709 days.

(21) Appl. No.: 17/640,049

(22) PCT Filed: Oct. 6, 2020

(86) PCT No.: PCT/EP2020/077906
§ 371 (c)(1),
(2) Date: Mar. 3, 2022

(87) PCT Pub. No.: WO2021/069396
PCT Pub. Date: Apr. 15, 2021

(65) Prior Publication Data
US 2022/0339841 A1    Oct. 27, 2022

(30) Foreign Application Priority Data
Oct. 10, 2019 (EP) .................................. 19202448

(51) Int. Cl.
*B29C 48/76* (2019.01)
*B29C 48/405* (2019.01)
(Continued)

(52) U.S. Cl.
CPC .......... *B29C 48/767* (2019.02); *B29C 48/405* (2019.02); *B29C 48/52* (2019.02); *B29C 48/535* (2019.02)

(58) Field of Classification Search
CPC .......................... B29C 48/405; B29C 48/767
(Continued)

(56) References Cited

U.S. PATENT DOCUMENTS 2,670,188 A * 2/1954 Erdmenger ............... A23G 1/06
366/291
3,575,382 A * 4/1971 Loomans ............... B29C 48/405
366/301

(Continued)

OTHER PUBLICATIONS

International Search Report for International Patent Application No. PCT/EP2020/077906, mailed Nov. 30, 2020. (English translation attached).
(Continued)

*Primary Examiner* — David L Sorkin
(74) *Attorney, Agent, or Firm* — K&L Gates LLP (57) ABSTRACT

A multi-shaft extruder which has screw shafts which are rotatable in the same direction and at the same speed, and which has at least one gas venting opening, and which has, in the entry region of said at least one gas venting opening, screw elements with a particularly large pitch or screw elements which have an asymmetric screw profile or which are mounted eccentrically on the axis of rotation of the screw shaft. The invention also relates to the use of the extruder according to the invention for processing or manufacturing plastic materials, and to the use of the screw elements with a particularly large pitch or the use of screw elements which have an asymmetric screw profile or which are mounted eccentrically on the axis of rotation of the screw shaft, in the region of the gas venting opening of a multi-shaft extruder.

20 Claims, 4 Drawing Sheets

(51) Int. Cl.
*B29C 48/52* (2019.01)
*B29C 48/535* (2019.01)

(58) Field of Classification Search
USPC .......................................................... 366/75
See application file for complete search history.

(56) References Cited

U.S. PATENT DOCUMENTS

| | | | | |
|---|---|---|---|---|
| 4,824,256 | A | * | 4/1989 | Haring .................... B29B 7/483 |
| | | | | 366/85 |
| 4,846,054 | A | * | 7/1989 | Mange ...................... B30B 9/16 |
| | | | | 100/145 |
| 5,024,531 | A | * | 6/1991 | Will ....................... B29C 48/767 |
| | | | | 366/76.9 |
| 5,306,452 | A | * | 4/1994 | Todd .................... B29C 48/395 |
| | | | | 366/85 |
| 5,811,511 | A | | 9/1998 | Tanigawa et al. |
| 6,511,217 | B1 | | 1/2003 | Silvi et al. |
| 2008/0036115 | A1 | | 2/2008 | Ueda et al. |

OTHER PUBLICATIONS

Written Opinion for International Patent Application No. PCT/EP2020/077906, mailed Nov. 30, 2020.

* cited by examiner

EXTRUDER HAVING SCREW ELEMENTS WITH A PARTICULARLY LARGE PITCH IN THE REGION OF THE GAS VENTING OPENING, AND USE OF SAID EXTRUDER

CROSS REFERENCE TO RELATED APPLICATIONS

This application is a U.S. national stage application, filed under 35 U.S.C. § 371, of International Application No. PCT/EP2020/077906, which was filed on Oct. 6, 2020, which claims priority to European Patent Application No. 19202448.7, which was filed on Oct. 10, 2019. The contents of each are hereby incorporated by reference into this specification.

FIELD

The present invention provides a multishaft extruder with screw shafts rotatable in the same sense and at the same speed, having at least one vent, and having, in the entry region of this at least one vent, screw elements having particularly high pitch or screw elements having an asymmetric screw profile or mounted eccentrically on the axis of rotation of the screw shaft. The present invention also provides for the use of the extruder of the invention for processing or production of plastic masses. The present invention also provides for the use of screw elements having particularly high pitch or for the use of screw elements having an asymmetric screw profile or mounted eccentrically on the axis of rotation of the screw shaft in the region of the vent of a multishaft extruder.

BACKGROUND

It is a feature of a screw element having particularly high pitch that it has a ratio X of slope T of the screw element to the inner housing diameter Di of the extruder of 1.75 to 15. It is a feature of an asymmetric screw element that there is no mirror axis through any point in the plane of the screw profile that can be used to generate a profile congruent to the original profile; there is preferably no mirror axis through any point within the screw profile, more preferably no mirror axis through the center of the screw profile area, that can be used to generate a profile congruent to the original profile. It is a feature of a screw element mounted eccentrically on the axis of rotation of the screw shaft that the pivot point of the screw profile is outside the center of the screw profile area. A screw element mounted eccentrically on the axis of rotation of the screw shaft may have a symmetric or asymmetric screw profile.

In the context of the present invention, the term "cross-sectional screw profile", also called "screw profile" for short, is understood to mean the outer contour of a screw element in cross section at right angles to the axis of rotation of the screw element.

The uses of extruders, especially multishaft extruders, include the devolatilization of plastic masses, especially the devolatilization of plastics, and in turn especially the devolatilization of melts or solutions of thermoplastic polymers or melts or solutions of rubbers. In order to remove volatile constituents, for example solvents or else monomers, that have not been converted to a polymer in the production thereof, such vented extruders generally have vents in the housing. The volatile constituents can be transferred there from the polymer to the gas phase and removed.

Vented extruders are sufficiently well known from the specialist literature, for example from
[1] ([1]=Klemens Kohlgrüber: Der gleichläufige Doppelschneckenextruder [*The Co-Rotating Twin Screw Extruder*], Hanser Verlag Munich 2007, p. 72-73 and 191-212).

In the region of a vent of a multishaft extruder, however, the polymer may be deposited if the polymer is not completely drawn in again at the outer edge of the vent that runs parallel to the screw flank turning downward. The bulge of polymer that then forms is exchanged more slowly than the rest of the polymer mass in the same cross section of the multishaft extruder. This can lead to a broader dwell time distribution of the polymer in the multishaft extruder and have the effect that the desired properties of the polymer are achieved only incompletely, if at all. Moreover, the maximum possible throughput of the multishaft extruder can be reduced by the re-entry of the polymer mass in the region of the vent if the vent is filled at high throughputs as a result of inadequate re-entry and the throughput has to be reduced to assure sufficient re-entry.

US2008036115A1 also discloses vented extruders. US2008036115A1 also shows that screw elements of various kinds can be used in such a vented extruder. However, the disclosure of US2008036115A1 does not address the disadvantages of the prior art mentioned.

SUMMARY

It is an object of the present invention to overcome the disadvantages of the prior art mentioned.

In particular, it is an object of the present invention to provide an extruder that overcomes the disadvantages of the prior art mentioned.

Surprisingly, the object is achieved by an extruder having the features of the main claim.

The invention therefore provides, in a first embodiment, an extruder having two or more screw shafts rotatable in the same sense and at the same speed,
wherein the extruder has at least one vent,
wherein, in the entry region of this at least one vent, each screw shaft
has at least one high-pitch screw element having a ratio X of pitch T to inner housing diameter Di of 1.75 to 15,
or
has at least one asymmetric screw element,
or
has at least one screw element mounted eccentrically on the axis of rotation of the screw shaft,
wherein these high-pitch screw elements,
or
these asymmetric screw elements,
or
these screw elements mounted eccentrically on the axis of rotation of the screw shaft,
are each immediately adjacent and opposite one another on immediately adjacent screw shafts,
wherein the entry region of the at least one vent is a section of the extruder which, based on the first edge of the vent in conveying direction, covers
(a) 100% of the length of the vent in conveying direction and extends counter to conveying direction, and
(b) 50% of the length of the vent in conveying direction and extends in conveying direction,
and from the first edge of the vent in conveying direction of the extruder, the at least one high-pitch screw element in each case, or the at least one asymmetric screw element in each case, or the at least one screw element mounted eccentrically on the axis of rotation of the screw shaft in each case, extends into the vent for 0% to 50% of the length of the vent, and the at least one high-pitch screw element in each case, or the at least one asymmetric screw element in each case, or the at least one screw element mounted eccentrically on the axis of rotation of the screw shaft in each case, commences in conveying direction before the first edge of the vent in conveying direction and extends at least to the first edge of the vent in conveying direction, wherein this at least one high-pitch screw element in each case or this at least one asymmetric screw element in each case or this at least one screw element mounted eccentrically on the axis of rotation of the screw shaft in each case is followed directly in conveying direction by at least one low-pitch screw element in each case having a ratio X of pitch T to inner housing diameter Di of less than 1.5.

BRIEF DESCRIPTION OF FIGURES

The invention will be explained in more detail and by way of example below with reference to the figures, but without being restricted thereto.

DETAILED DESCRIPTION

It will be clear to a person skilled in the art that a multishaft extruder with screw shafts rotatable in the same sense and at the same speed, when used as intended, will have screw shafts that rotate in the same sense and at the same speed.

In the context of the present invention, a screw element with particularly high pitch, also called high-pitch screw element hereinafter, is a screw element that has a ratio X of pitch T of the screw element to inner housing diameter Di of the extruder of 1.75 to 15, i.e.:

$$1.75 \leq X = T/D \leq 15.$$

Preferably, for the high-pitch screw element, $$2 \leq X = T/D \leq 10,$$

and more preferably $$2.5 \leq X = T/D \leq 5.$$

The pitch T of a screw element is the axial length required for a complete rotation of the screw profile of the screw element. The inner housing diameter Di is the inner diameter of the cross section of the housing bore within which the respective screw shaft on which the screw element in question is mounted is present. A multishaft extruder has a number of interpenetrating circular housing bores, thus forming an intersection, and each having an identical inner housing diameter Di, which number corresponds to the number of shafts.

A low-pitch screw element in the context of the invention is a screw element that has a ratio X of slope T of the screw element to inner housing diameter Di of the extruder of less than 1.5, preferably of 1.2 or less.

The expression "entry region of this at least one vent" as defined above is not the same as the term "region of a vent". The expression "region of a vent" means the volume within the extruder including the inner volume of the vent, which begins in conveying direction with the front inner edge of the vent and ends with the rear inner edge of the vent.

It is preferable here in accordance with the invention that each high-pitch screw element is simultaneously an asymmetric screw element or a screw element mounted eccentrically on the axis of rotation of the screw shaft, i.e. each high-pitch screw element additionally has the features of an asymmetric screw element or the features of a screw element mounted eccentrically on the axis of rotation of the screw shaft.

This preferred embodiment of the extruder of the invention is a second embodiment according to the first embodiment presented above.

It is further preferable here in accordance with the invention that each high-pitch screw element is simultaneously both an asymmetric screw element and a screw element mounted eccentrically on the axis of rotation of the screw shaft, i.e. each high-pitch screw element additionally has the features of an asymmetric screw element and the features of a screw element mounted eccentrically on the axis of rotation of the screw shaft.

This further preferred embodiment of the extruder of the invention is a third embodiment according to the first embodiment presented above or according to the second embodiment presented above.

It is particularly preferable here in accordance with the invention that the at least one high-pitch screw element in each case or the at least one asymmetric screw element in each case or the at least one screw element mounted eccentrically on the axis of rotation of the screw shaft in each case, from the first edge of the vent in conveying direction of the extruder, extends into the vent for not more than 20%, preferably not more than 10% of the length of the vent.

This particularly preferred embodiment of the extruder of the invention is a fourth embodiment according to one of the embodiments presented above; more particularly, this fourth embodiment is an embodiment according to the first embodiment presented above.

It is further particularly preferable here in accordance with the invention that the at least one high-pitch screw element in each case or the at least one asymmetric screw element in each case or the at least one screw element mounted eccentrically on the axis of rotation of the screw shaft in each case, from the first edge of the vent in conveying direction of the extruder, extends for at least 10% to a maximum of 100%, preferably at least 20% to a maximum of 50%, of the length of the vent counter to the conveying direction.

This further particularly preferred embodiment of the extruder of the invention is a fifth embodiment according to one of the embodiments presented above; more particularly, this fifth embodiment is an embodiment according to the first embodiment presented above.

It is very particularly preferable here in accordance with the invention that, in the entry region of the at least one vent, each screw shaft has exactly one screw element which is a high-pitch screw element or an asymmetric screw element or a screw element mounted eccentrically on the axis of rotation of the screw shaft.

This very particularly preferred embodiment of the extruder of the invention is a sixth embodiment according to one of the embodiments presented above; more particularly, this sixth embodiment is an embodiment according to the first embodiment presented above.

In other words, regardless of whether the special screw element is a high-pitch screw element or an asymmetric screw element or a screw element mounted eccentrically on the axis of rotation of the screw shaft, what follows in the section of the extruder in which the at least one vent is present is neither a high-pitch screw element nor an asymmetric screw element nor a screw element mounted eccentrically on the axis of rotation of the screw shaft.

It is further very particularly preferable here in accordance with the invention that the axial length of the at least one high-pitch screw element in each case or the at least one asymmetric screw element in each case or the at least one screw element mounted eccentrically on the axis of rotation of the screw shaft in each case is 0.1 to 3, preferably 0.5 to 1, of the inner housing diameter Di.

This further very particularly preferred embodiment of the extruder of the invention is a seventh embodiment according to one of the embodiments presented above; more particularly, this seventh embodiment is an embodiment according to the first embodiment presented above.

According to the invention, when two or more screw elements that are a high-pitch screw element or an asymmetric screw element or a screw element mounted eccentrically on the axis of rotation of the screw shaft have an axial length less than 0.5 of the inner housing diameter Di, and these two or more such screw elements that are a high-pitch screw element or an asymmetric screw element or a screw element mounted eccentrically on the axis of rotation of the screw shaft are arranged in immediate axial succession, these are regarded as a screw element which is a high-pitch screw element or an asymmetric screw element or a screw element mounted eccentrically on the axis of rotation of the screw shaft provided that the sum total of the axial lengths of these screw elements reduced by the axial length of the last screw element in conveying direction that is a high-pitch screw element or an asymmetric screw element or a screw element mounted eccentrically on the axis of rotation of the screw shaft does not exceed 3 of, i.e. three times, the inner housing diameter Di.

According to the invention, it is also preferably the case that, when two or more screw elements that are a high-pitch screw element or an asymmetric screw element or a screw element mounted eccentrically on the axis of rotation of the screw shaft have an axial length less than 0.1 of the inner housing diameter Di, and these two or more such screw elements that are a high-pitch screw element or an asymmetric screw element or a screw element mounted eccentrically on the axis of rotation of the screw shaft are arranged in immediate axial succession, these are regarded as a screw element which is a high-pitch screw element or an asymmetric screw element or a screw element mounted eccentrically on the axis of rotation of the screw shaft provided that the sum total of the axial lengths of these screw elements reduced by the axial length of the last screw element in conveying direction that is a high-pitch screw element or an asymmetric screw element or a screw element mounted eccentrically on the axis of rotation of the screw shaft does not exceed 1 of, i.e. one times, the inner housing diameter Di.

Both for the case in accordance with the invention and the case preferred in accordance with the invention, spacers disposed between two or more such screw elements arranged in axial succession that are a high-pitch screw element or an asymmetric screw element or a screw element mounted eccentrically on the axis of rotation of the screw shaft are not included in the consideration, meaning that, if there are one or more spacers between two screw elements arranged in axial succession that are a high-pitch screw element or an asymmetric screw element or a screw element mounted eccentrically on the axis of rotation of the screw shaft, these two screw elements are considered to be screw elements arranged in immediate succession that are a high-pitch screw element or an asymmetric screw element or a screw element mounted eccentrically on the axis of rotation of the screw shaft.

It is especially preferable here in accordance with the invention that the at least one screw element in each case which is a high-pitch screw element or an asymmetric screw element or a screw element mounted eccentrically on the axis of rotation of the screw shaft is a conveying element.

This especially preferred embodiment of the extruder of the invention is an eighth embodiment according to one of the embodiments presented above; more particularly, this eighth embodiment is an embodiment according to the first embodiment presented above.

Figure 1:
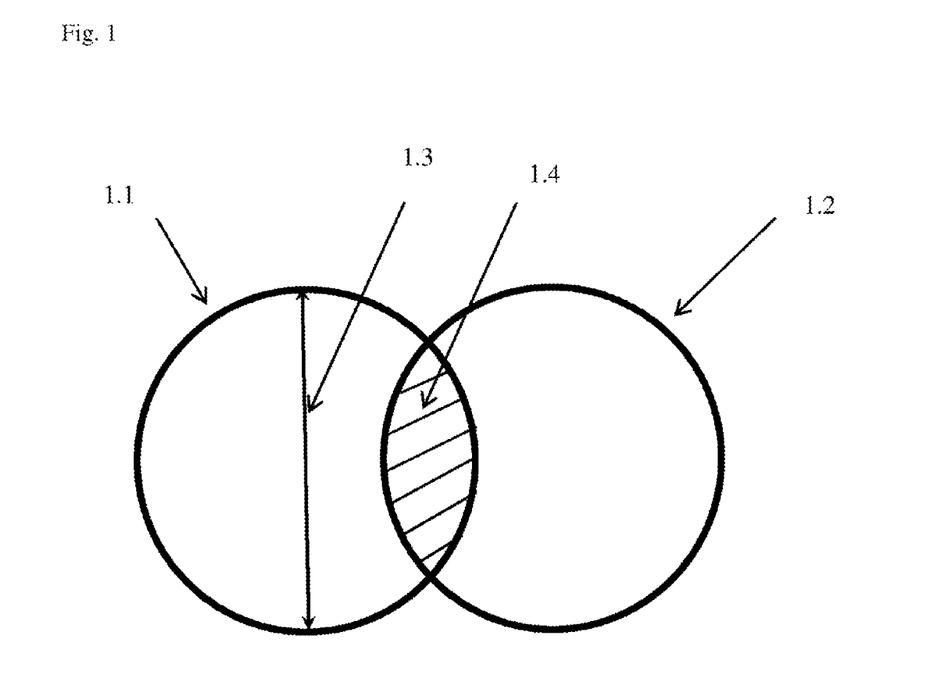
FIG. 1 shows a cross section of the two housing bores of a twin-screw extruder, with the two housing bores penetrating the same inner housing diameter Di and forming a circle intersection. The inner housing diameter Di of one of the housing bores is shown. The cross section of the first housing bore is identified as 1.1, the cross section of the second housing bore as 1.2, the inner diameter Di of the first housing bore as 1.3, and the circle intersection as 1.4.
Figure 2:
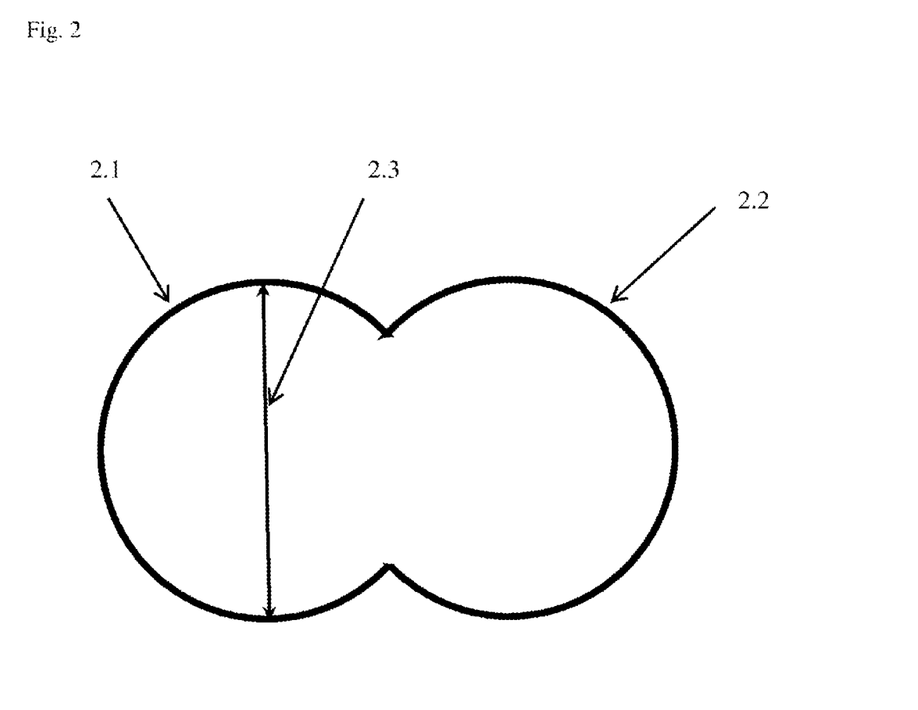
FIG. 2 shows the cross section from FIG. 1 without showing the circle intersection. Here too, the inner housing diameter Di of one of the housing bores is shown. The inner housing diameter Di of one of the housing bores is shown. The cross section of the first housing bore is identified as 2.1, the cross section of the second housing bore as 2.2, and the inner diameter Di of the first housing bore as 2.3.
Figure 3:
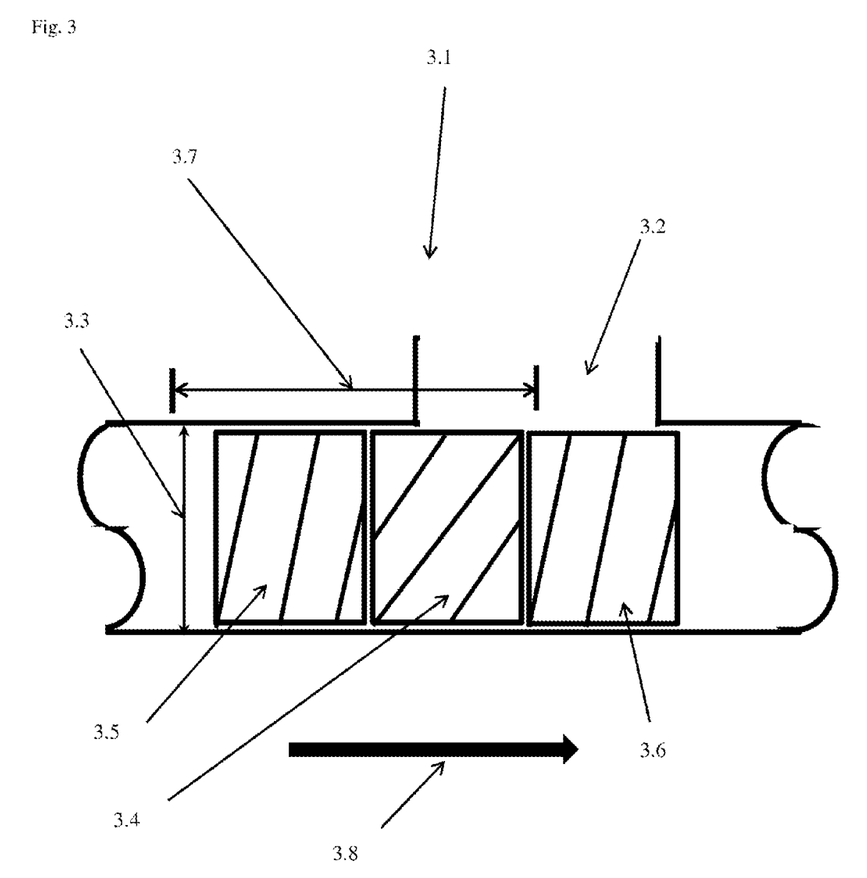
FIG. 3 shows a longitudinal section through a segment of a vented extruder of the invention, with this segment showing both a vent and a high-pitch screw element. The segment of the vented extruder of the invention is identified as 3.1, the vent is identified as 3.2, the inner housing diameter is identified as 3.3, the high-pitch screw element is identified as 3.4, the low-pitch screw element upstream of the high-pitch screw element in conveying direction is identified as 3.5, the low-pitch screw element beyond the high-pitch screw element in conveying direction is identified as 3.6, the length of the entry region of the vent is identified as 3.7, and the conveying direction is identified as 3.8.
Figure 4:
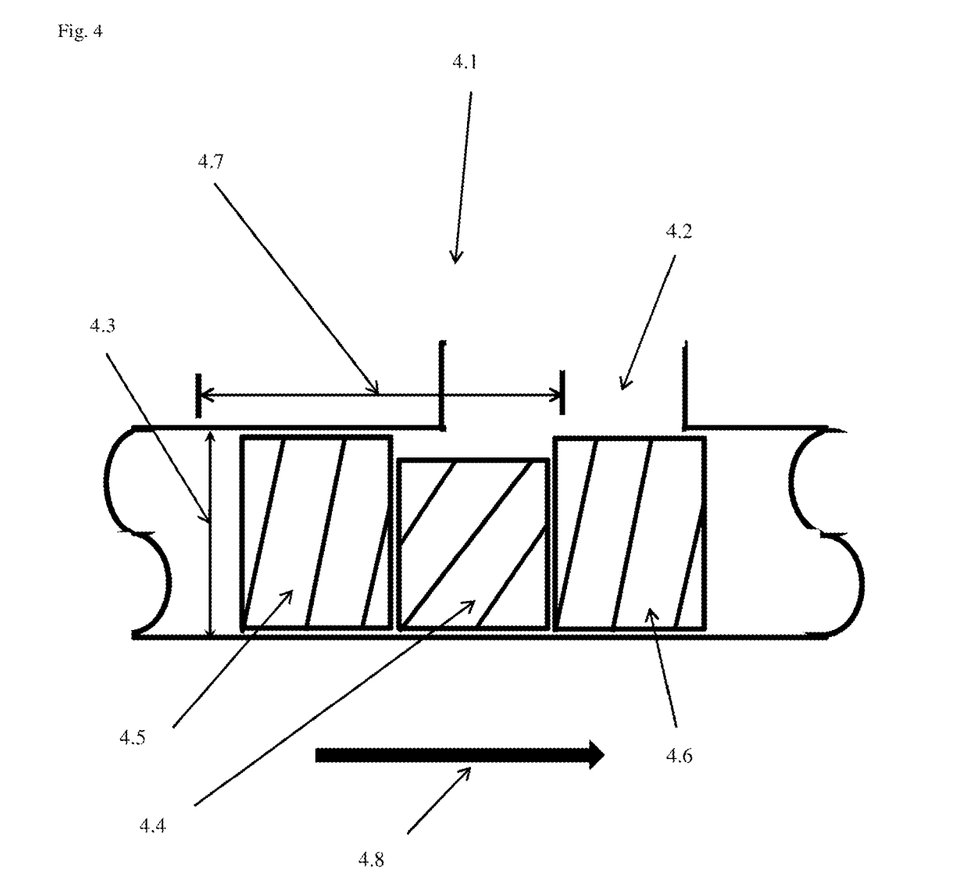
FIG. 4 shows a longitudinal section through a segment of a vented extruder of the invention, with this segment showing both a vent and an asymmetric screw element. The segment of the vented extruder of the invention is identified as 4.1, the vent is identified as 4.2, the inner housing diameter is identified as 4.3, the asymmetric screw element is identified as 4.4, the non-asymmetric screw element upstream of the asymmetric screw element in conveying direction is identified as 4.5, the non-asymmetric screw element beyond the asymmetric screw element in conveying direction is identified as 4.6, the length of the entry region of the vent is identified as 4.7, and the conveying direction is identified as 4.8. The asymmetric screw element is simultaneously a screw element mounted eccentrically on the axis of rotation of the screw shaft.

It is further especially preferable here in accordance with the invention that the at least one high-pitch screw element (3.4) in each case or the at least one asymmetric screw element (4.4) in each case or the at least one screw element mounted eccentrically on the axis of rotation of the screw shaft in each case is a single-flight screw element, a double-flight screw element, a triple-flight screw element or a quadruple-flight screw element, preferably a double-flight screw element.

This further especially preferred embodiment of the extruder of the invention is a ninth embodiment according to one of the embodiments presented above; more particularly, this ninth embodiment is an embodiment according to the first embodiment presented above.

It is very especially preferable here in accordance with the invention that, in the entry region of the at least one vent, each screw shaft has at least one screw element which is neither a high-pitch screw element (3.4) nor an asymmetric screw element (4.4) nor a screw element mounted eccentrically on the axis of rotation of the screw shaft; this screw element is preferably a conveying element.

This further very especially preferred embodiment of the extruder of the invention is a tenth embodiment according to one of the embodiments presented above; more particularly, this tenth embodiment is an embodiment according to the first embodiment presented above.

It is further very especially preferable here in accordance with the invention that a screw element which is neither a high-pitch screw element nor an asymmetric screw element nor a screw element mounted eccentrically on the axis of rotation of the screw shaft has an axial length which is 0.1 to 3, preferably 0.5 to 1.5, of the inner housing diameter Di; this screw element is preferably a single-flight screw element, a double-flight screw element, a triple-flight screw element or a quadruple-flight screw element, preferably a double-flight screw element; further preferably, this screw element is a conveying element.

This further very especially preferred embodiment of the extruder of the invention is an eleventh embodiment according to the tenth embodiment presented above.

It is also preferred in accordance with the invention that the length of the vent in conveying direction is from 50% to 750% of the inner housing diameter Di of the extruder.

This also preferred embodiment of the extruder of the invention is a twelfth embodiment according to one of the embodiments presented above; more particularly, this twelfth embodiment is an embodiment according to the first embodiment presented above.

It is further also preferred in accordance with the invention that the cross-sectional area of the vent is from 50% to 1400% of the square root of the inner housing diameter Di of the extruder.

This further also preferred embodiment of the extruder of the invention is a thirteenth embodiment according to one of the embodiments presented above; more particularly, this thirteenth embodiment is an embodiment according to the first embodiment presented above.

The extruder of the invention prevents polymer from running down the outer edge of the vent that runs parallel to the screw flank rotating downward, not being fully taken in again, and resulting in deposits of the polymer.

This also reduces the risk of a broader dwell time distribution of the polymer in the multishaft extruder, such that the desired properties of the polymer can be achieved more easily. In the extruder of the invention, the throughput of the multishaft extruder in the region of the vent is also conveyed, as a result of which the total throughput of the multishaft extruder is conveyed and hence, in turn, the ratio of total throughput of the multishaft extruder to drive energy consumed for the screw shafts is increased.

The present invention also provides for the use of the extruder of the invention for production and processing, especially devolatilization, of plastic masses, especially for production and processing of melts or solutions of thermoplastic polymers or melts or solutions of rubbers.

The object stated at the outset is also achieved by this further subject matter of the present invention.

In the context of the present invention, a multishaft extruder is understood to mean an extruder having more than one screw shaft, for example an extruder having two, three or four screw shaft or else an extruder having eight to sixteen, especially twelve, screw shafts in an annular arrangement. In the case of more than two screw shafts, the axes of rotation of the screw shafts may be arranged alongside one another in a polygon having a number of vertices equal to the number of shafts, or else, for example—as in the case of what is called a ring extruder—in annular form. In the case of multishaft extruders, the axes of rotation of the screw shafts are generally arranged parallel to one another, but they may also be arranged non-parallel to one another. Such an extruder having more than one screw shaft is also referred to hereinafter as multishaft screw machine or multishaft extruder. A twin-shaft screw machine is also referred to hereinafter as twin-screw extruder. In the context of the present invention, the term "extruder" is used synonymously with the term "screw machine". The multishaft extruder of the invention is preferably an extruder having screw shafts rotatable at the same speed and in the same sense. The multishaft extruder of the invention is more preferably a twin-screw extruder having screw shafts that can rotate at the same speed and in the same sense or a multishaft extruder having multiple—especially eight or twelve—screw shafts rotatable at the same speed and in the same sense that are arranged in a ring with respect to one another; most preferably, the multishaft extruder of the invention is a twin-screw extruder having screw shafts rotatable at the same speed and in the same sense, these screw shafts especially being arranged parallel to one another.

Typically, screw shafts for multishaft extruders, according to the prior art, are built in modular form from screw elements that are mounted on a core shaft. In the extruder of the invention, in the region of the at least one vent, the screw elements are arranged opposite one another on the screw shafts with a particularly high pitch in a number corresponding to the number of screw shafts of the respective extruder. The screw elements that are a high-pitch screw element or an asymmetric screw element or a screw element mounted eccentrically on the axis of rotation of the screw shaft may have the same or different screw profiles.

The screw elements that are a high-pitch screw element or an asymmetric screw element or a screw element mounted eccentrically on the axis of rotation of the screw shaft may be present in the extruder of the invention in the form of kneading, conveying or mixing elements; the screw elements that are a high-pitch screw element or an asymmetric screw element or a screw element mounted eccentrically on the axis of rotation of the screw shaft are preferably conveying elements.

In the case of kneading elements, the pitch T is the sum total of the axial lengths of successive rows of kneading disks which is required for complete rotation of the kneading disk profile.

In the context of the present invention, the term "kneading disk profile", also called "kneading disk cross-sectional profile", is understood to mean the outer contour of a kneading disk in cross section at right angles to the axis of rotation of the kneading disk.

As is well known, it is a feature of a conveying element (see for example [1], pages 227-248) that a screw profile has continuous helical turns continuing in axial direction. The conveying element may be right-handed or left-handed.

As is well known, it is a feature of a kneading element (see for example [1], pages 227-248) that a screw profile is continued batchwise in axial direction in the form of kneading disks. The arrangement of the kneading disks may be right-handed or left-handed or neutral.

As is well known (see for example [1], pages 227-248), mixing elements are formed in that conveying elements are provided with apertures in the screw flight lands. The mixing elements may be right-handed or left-handed. The apertures preferably have the form of a u-shaped or v-shaped groove, and these are preferably in a counter-conveying or axially parallel arrangement.

A screw element which is a high-pitch screw element or an asymmetric screw element or a screw element mounted eccentrically on the axis of rotation of the screw shaft may also be configured as a transition element, meaning that the screw profile at any point in the axial extent of the screw element is different than at another point in the axial extent of the screw element, with these different profiles not being interconvertible by rotation.

Screw elements that are a high-pitch screw element or an asymmetric screw element or a screw element mounted eccentrically on the axis of rotation of the screw shaft and are mounted opposite one another on adjacent screw shafts preferably clean one another—taking account of the tolerances that are necessary for technical purposes. It is alternatively possible to use screw elements opposite one another on adjacent screw shafts that are a high-pitch screw element or an asymmetric screw element or a screw element mounted eccentrically on the axis of rotation of the screw shaft that do not exactly clean one another.

In the context of the present invention, plastic masses are especially understood to mean:
suspensions, pastes, glass melts, unfired ceramics, metal melt, or plastics.

In the context of the present invention, plastics are especially understood to mean:
polymers, especially polymer melts or polymer solutions, and in turn especially melts or solutions of thermoplastic polymers or melts or solutions of rubbers.

The thermoplastic polymer used is preferably at least one from the group of polycarbonate, polyamide, polyester, in particular polybutylene terephthalate and polyethylene terephthalate, polylactide, polyether, thermoplastic polyurethane, polyacetal, fluoropolymer, in particular polyvinylidene fluoride, polyether sulfones, polyolefin, in particular polyethylene and polypropylene, polyimide, polyacrylate, in particular poly(methyl)methacrylate, polyphenylene oxide, polyphenylene sulfide, polyetherketone, polyaryletherketone, styrene polymers, in particular polystyrene, styrene copolymers, in particular styrene-acrylonitrile copolymer, acrylonitrile-butadiene-styrene block copolymers and polyvinyl chloride. Similarly preferably used are what are known as blends of the polymers listed, which a person skilled in the art understands to be a combination of two or more polymers. Particularly preferred are polycarbonate and mixtures containing polycarbonate, very particularly preferably polycarbonate, which are obtained, for example, by the interfacial process or the melt transesterification process.

The rubber used is preferably at least one from the group of styrene-butadiene rubber, natural rubber, butadiene rubber, isoprene rubber, ethylene-propylene-diene rubber, ethylene-propylene rubber, butadiene-acrylonitrile rubber, hydrogenated nitrile rubber, butyl rubber, halobutyl rubber, chloroprene rubber, ethylene-vinyl acetate rubber, polyurethane rubber, thermoplastic polyurethane, gutta-percha, acrylate rubber, fluorinated rubber, silicone rubber, sulfide rubber and chlorosulfonyl polyethylene rubber. A combination of two or more of the rubbers listed, or a combination of one or more rubbers with one or more other plastics, is of course also possible.

These thermoplastics or rubbers may be used in pure form or as mixtures with fillers and reinforcers, such as in particular glass fibers, as mixtures with one another or with other polymers, or as mixtures with customary polymer additives.

In a preferred embodiment, additives are added to the plastic masses, in particular to the polymer melts and mixtures of polymer melts. Said additives may be added to the extruder in solid, liquid or solution form together with the polymer, or else at least some or all of the additives are fed to the extruder via a side stream.

Additives can provide a polymer with a wide variety of properties. Said additives may, for example, colorants, pigments, processing aids, fillers, antioxidants, reinforcers, UV absorbers and light stabilizers, metal deactivators, peroxide scavengers, basic stabilizers, nucleating agents, benzofurans and indolinones which have a stabilizing or antioxidant action, mold release agents, flame retardant additives, antistatic agents, dyes and melt stabilizers. Examples of these are carbon black, glass fibers, clay, mica, graphite fibers, titanium dioxide, carbon fibers, carbon nanotubes, ionic liquids and natural fibers.

What is claimed is:

1. An extruder having two or more screw shafts rotatable in the same sense and at the same speed, wherein the extruder comprises a housing having an inner housing diameter Di,
    wherein the extruder has at least one vent,
    wherein, in the entry region of the at least one vent,
    each screw shaft has at least one high-pitch screw element having a ratio X of pitch T to
    inner housing diameter Di of 1.75 to 15,
    or
    has at least one asymmetric screw element,
    or
    has at least one screw element mounted eccentrically on the axis of rotation of the screw shaft, wherein the high-pitch screw elements
    or
    the asymmetric screw elements,
    or
    the screw elements mounted eccentrically on the axis of rotation of the screw shaft, are each immediately adjacent and opposite one another on immediately adjacent screw shafts,
    wherein the entry region of the at least one vent is a section of the extruder having a position based on the first edge of the vent in conveying direction, wherein the entry region is configured to:
    (a) begin at a point at 100% of the length of the vent in conveying direction before the first edge of the vent, and
    (b) end in the vent at a point at 50% of the length of the vent in conveying direction,
    and
    from the first edge of the vent in conveying direction of the extruder, the at least one high-pitch screw element in each case,
    or
    the at least one asymmetric screw element in each case, or the at least one screw element mounted eccentrically on the axis of rotation of the screw shaft in each case, extends into the vent for 0% to 50% of the length of the vent, and the at least one high-pitch screw element in each case, or the at least one asymmetric screw element in each case, or the at least one screw element mounted eccentrically on the axis of rotation of the screw shaft in each case, commences in a conveying direction before the first edge of the vent in the conveying direction and extends at least to the first edge of the vent in the conveying direction, wherein the at least one high-pitch screw element in each case or the at least one asymmetric screw element in each case or the at least one screw element mounted eccentrically on the axis of rotation of the screw shaft in each case is followed directly in conveying direction by at least one low-pitch screw element in each case having a ratio X of pitch T to inner housing diameter Di of less than 1.5.

2. The extruder as claimed in claim 1, wherein each high-pitch screw element is simultaneously an asymmetric screw element or a screw element mounted eccentrically on the axis of rotation of the screw shaft.

3. The extruder as claimed in claim 1, wherein each high-pitch screw element is simultaneously both an asymmetric screw element and a screw element mounted eccentrically on the axis of rotation of the screw shaft.

4. The extruder as claimed in claim 1, wherein the at least one high-pitch screw element in each case or the at least one asymmetric screw element in each case or the at least one screw element mounted eccentrically on the axis of rotation of the screw shaft in each case, from the first edge of the vent in the conveying direction of the extruder, extends into the vent for not more than 20% of the length of the vent.

5. The extruder as claimed in claim 1, wherein the at least one high-pitch screw element in each case or the at least one asymmetric screw element in each case or the at least one screw element mounted eccentrically on the axis of rotation of the screw shaft in each case, from the first edge of the vent in conveying direction of the extruder, extends for at least 10% to a maximum of 100% of the length of the vent counter to conveying direction.

6. The extruder as claimed in claim 1, wherein, in the entry region of the at least one vent, each screw shaft has exactly one screw element which is a high-pitch screw element or an asymmetric screw element or a screw element mounted eccentrically on the axis of rotation of the screw shaft.

7. The extruder as claimed in claim 1, wherein the axial length of the at least one high-pitch screw element in each case or the at least one asymmetric screw element in each case or the at least one screw element mounted eccentrically on the axis of rotation of the screw shaft in each case is 0.1 to 3 of the inner housing diameter Di.

8. The extruder as claimed in claim 1, wherein the at least one screw element in each case which is a high-pitch screw element or an asymmetric screw element or a screw element mounted eccentrically on the axis of rotation of the screw shaft is a conveying element.

9. The extruder as claimed in claim 1, wherein the at least one high-pitch screw element in each case or the at least one asymmetric screw element in each case or the at least one screw element mounted eccentrically on the axis of rotation of the screw shaft in each case is a single-flight screw element, a double-flight screw element, a triple-flight screw element or a quadruple-flight screw element.

10. The extruder as claimed in claim 1, wherein, in the entry region of the at least one vent, each screw shaft has at least one screw element which is neither a high-pitch screw element nor an asymmetric screw element nor a screw element mounted eccentrically on the axis of rotation of the screw shaft.

11. The extruder as claimed in claim 10, wherein the at least one screw element present on each screw shaft in the entry region of the at least one vent which is neither a high-pitch screw element nor an asymmetric screw element nor a screw element mounted eccentrically on the axis of rotation of the screw shaft has an axial length which is 0.1 to 3 of the inner housing diameter Di.

12. The extruder as claimed in claim 1, wherein the length of the vent in conveying direction is from 50% to 750% of the inner housing diameter Di of the extruder.

13. The extruder as claimed in claim 1, wherein the cross-sectional area of the vent is from 50% to 1400% of the square root of the inner housing diameter Di of the extruder.

14. A method comprising producing and processing plastic masses with the extruder as claimed in claim 1.

15. The extruder as claimed in claim 4, wherein the at least one high-pitch screw element in each case or the at least one asymmetric screw element in each case or the at least one screw element mounted eccentrically on the axis of rotation of the screw shaft in each case, from the first edge of the vent in conveying direction of the extruder, extends into the vent for not more than 10% of the length of the vent.

16. The extruder as claimed in claim 5, wherein the at least one high-pitch screw element in each case or the at least one asymmetric screw element in each case or the at least one screw element mounted eccentrically on the axis of rotation of the screw shaft in each case, from the first edge of the vent in conveying direction of the extruder, extends for at least 20% to a maximum of 50% of the length of the vent counter to conveying direction.

17. The extruder as claimed in claim 7, wherein the axial length of the at least one high-pitch screw element in each case or the at least one asymmetric screw element in each case or the at least one screw element mounted eccentrically on the axis of rotation of the screw shaft in each case is 0.5 to 1 of the inner housing diameter Di.

18. The extruder as claimed in claim 9, wherein the at least one high-pitch screw element in each case or the at least one asymmetric screw element in each case or the at least one screw element mounted eccentrically on the axis of rotation of the screw shaft in each case is a double-flight screw element.

19. The extruder as claimed in claim 11, wherein the at least one screw element present on each screw shaft in the entry region of the at least one vent which is neither a high-pitch screw element nor an asymmetric screw element nor a screw element mounted eccentrically on the axis of rotation of the screw shaft has an axial length which is 0.5 to 1.5 of the inner housing diameter Di.

20. The method as claimed in claim 14, wherein the plastic masses are melts or solutions of thermoplastic polymers or melts or solutions of rubbers.

* * * * *